United States Patent
Lin et al.

(10) Patent No.: US 8,573,811 B2
(45) Date of Patent: Nov. 5, 2013

(54) BACKLIGHT MODULE WITH HEAT DISSIPATING ELEMENT AND HEAT SINK

(75) Inventors: Hung-Chih Lin, Hsinchu (TW); Yi-Wen Lin, Hsinchu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 145 days.

(21) Appl. No.: 13/073,057

(22) Filed: Mar. 28, 2011

(65) Prior Publication Data
US 2011/0249470 A1  Oct. 13, 2011

(30) Foreign Application Priority Data
Apr. 12, 2010 (TW) ................................ 99111206 A

(51) Int. Cl.
*F21V 29/00* (2006.01)

(52) U.S. Cl.
USPC .......... 362/294; 362/612; 362/632; 362/97.3; 362/249.02; 362/373

(58) Field of Classification Search
USPC ........ 362/612, 613, 632, 633, 634, 97.3, 218, 362/249.02, 294, 373
See application file for complete search history.

(56) References Cited

U.S. PATENT DOCUMENTS

| | | | | |
|---|---|---|---|---|
| 7,374,306 B2* | 5/2008 | Liu | ................................ | 362/27 |
| 7,431,475 B2* | 10/2008 | Hafuka et al. | ................. | 362/218 |
| 7,452,109 B2* | 11/2008 | Noh et al. | ..................... | 362/294 |
| 7,452,121 B2* | 11/2008 | Cho et al. | ...................... | 362/633 |
| 7,467,882 B2* | 12/2008 | Chang et al. | .................. | 362/373 |
| 7,513,661 B2* | 4/2009 | Hamada et al. | ............... | 362/373 |
| 7,527,409 B2* | 5/2009 | Atarashi et al. | ............... | 362/613 |
| 7,563,014 B2* | 7/2009 | Ogawa | .......................... | 362/628 |
| 7,651,249 B2* | 1/2010 | Ohashi et al. | .................. | 362/373 |
| 7,661,834 B2* | 2/2010 | Fenyo | .............................. | 362/19 |
| 7,710,531 B2* | 5/2010 | Kurokawa et al. | ............. | 349/161 |
| 8,197,099 B2* | 6/2012 | Oyaizu et al. | .................. | 362/294 |
| 2006/0245214 A1* | 11/2006 | Kim | .............................. | 362/632 |
| 2009/0168403 A1 | 7/2009 | Chang et al. | | |

FOREIGN PATENT DOCUMENTS

| | | |
|---|---|---|
| JP | 11-119216 A | 4/1999 |
| JP | 2004-165031 A | 6/2004 |
| TW | 546491 | 8/2003 |
| TW | M258298 A | 3/2005 |
| TW | M273191 A | 8/2005 |
| TW | M325447 | 1/2008 |
| TW | M344027 | 11/2008 |

OTHER PUBLICATIONS

Taiwan Office Action for corresponding Taiwan Application dated Feb. 23, 2013 with English translation.

* cited by examiner

*Primary Examiner* — Ismael Negron
(74) *Attorney, Agent, or Firm* — Muncy, Geissler, Olds & Lowe, PLLC

(57) ABSTRACT

A backlight module includes a light guide plate, a back plate, a heat-dissipating element, a light-emitting element, and at least one high-performance heat sink. The heat-dissipating element is disposed adjacent to a light incident surface of the light guide plate, and the heat-dissipating element has a bottom portion and a side portion forming an angle with the bottom portion. The light-emitting element is disposed on one side of the heat-dissipating element facing the light guide plate. The high-performance heat sink is disposed on the back plate, one end of the high-performance heat sink overlaps the heat-dissipating element, and another end of the high-performance heat sink extends away from the light-emitting element.

4 Claims, 8 Drawing Sheets

BACKLIGHT MODULE WITH HEAT DISSIPATING ELEMENT AND HEAT SINK

BACKGROUND OF THE INVENTION a. Field of the Invention

The invention relates to a backlight module.

b. Description of the Related Art

FIG. 9 shows a schematic diagram of a conventional backlight module. Referring to FIG. 9, an edge-lighting type backlight module 100 includes a back plate 102, a light-emitting diode (LED) light bar 104, a light guide plate 106, and a reflective sheet 110. The LED light bar 104 is disposed on one side of the light guide plate 106 to form the edge-lighting type backlight module 100 emitting light from a single side. The number of light-emitting diodes used in the edge-lighting type backlight module 100 is allowed to be reduced, but each light-emitting diode requires much higher brightness and power instead. Hence, a considerable amount of heat is produced and accumulated around the LED light bar 104 and is difficult to disperse. Under the circumstance, the luminous uniformity is reduced and optical components in the edge-lighting type backlight module 100 are liable to deform as a result of thermal deformation.

Hence, some conventional designs are proposed to solve this problem. For example, Taiwan patent no. M325447 discloses an LED heat dissipation module using a heat pipe to increase heat dissipation efficiency. Besides, Taiwan patent no. 546491 also discloses a backlight module using a heat pipe to increase heat dissipation efficiency.

BRIEF SUMMARY OF THE INVENTION

The invention provides a backlight module having at least one advantages of improved thermal uniformity, high heat dissipation efficiency, and reinforced structure strength.

Other objects and advantages of the invention may be further illustrated by the technical features broadly embodied and described as follows.

One embodiment of the invention provides a backlight module. The backlight module includes a light guide plate, a back plate, a heat-dissipating element, a light-emitting element, and at least one high-performance heat sink. The light guide plate has a light incident surface, and the back plate is disposed on a bottom side of the light guide plate. The heat-dissipating element is disposed adjacent to the light incident surface, and the heat-dissipating element has a bottom portion and a side portion forming an angle with the bottom portion. The light-emitting element is disposed on one side of the heat-dissipating element facing the light guide plate. The high-performance heat sink is disposed between the heat-dissipating element and the back plate and in contact with the heat-dissipating element and the back plate.

In one embodiment, the light-emitting element is an LED light bar, and the LED light bar has a plurality of top-emission light-emitting diodes and is attached to the side portion of the heat-dissipating element.

In one embodiment, the light-emitting element is an LED light bar, and the LED light bar has a plurality of side-emission light-emitting diodes and is attached to the bottom portion of the heat-dissipating element.

In one embodiment, the heat-dissipating element has a T-shaped cross-section or an L-shaped cross-section.

In one embodiment, one end of the high-performance heat sink touches the bottom portion of the heat-dissipating element, and another end of the high-performance heat sink extends away from the light-emitting element, and the high-performance heat sink spreads on different regions of the back plate.

In one embodiment, the high-performance heat sink includes at least one of a heat pipe, a heat column, and a heat spreader.

According to another embodiment of the invention, a backlight module includes a light guide plate, a back plate, a heat-dissipating element, a light-emitting element, and at least one high-performance heat sink. The light guide plate has a light incident surface, and the back plate is disposed on a bottom side of the light guide plate. The heat-dissipating element is disposed adjacent to the light incident surface, and the heat-dissipating element has a bottom portion and a side portion forming an angle with the bottom portion. The light-emitting element is disposed on one side of the heat-dissipating element facing the light guide plate. The high-performance heat sink is disposed on the back plate, one end of the high-performance heat sink overlaps the heat-dissipating element, and another end of the high-performance heat sink extends away from the light-emitting element.

The embodiment or the embodiments of the invention may have at least one of the following advantages. According to the above embodiments, since the high-performance heat sink is in contact with both the heat-dissipating element and the back plate, the end of the high-performance heat sink touching the heat-dissipating element is allowed to quickly absorb the heat and transfer the heat to an opposite end of the high-performance heat sink touching the back plate. Besides, the high-performance heat sink extending away from the light-emitting element may spread on different regions of the back plate to facilitate heat dissipation and avoid heat accumulation in an edge-lighting type backlight module. As a result, the heat generated by the light-emitting element is allowed to be effectively conducted to and uniformly dispersed in a cold section of the back plate to ensure thermal uniformity and prevent thermal deformation in the backlight module. Further, the bottom portion and the side portion of the heat-dissipating element together form the structure of a reinforced rib. The reinforced rib may enhance the structure strength to resist thermal deformation, reduce overall thickness, and improve the heat conduction and heat dissipation efficiency for an LED light bar. In addition, the bottom portion and the side portion of the heat-dissipating element may be perpendicular to each other to form a T-shaped cross-section or an L-shaped cross-section. Since an LED light bar is allowed to be screwed on a horizontal wall or a vertical wall of the T-shaped or L-shaped cross-section according to the actual demand, such assembly is suitable for light-emitting diodes having different light-emitting directions.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
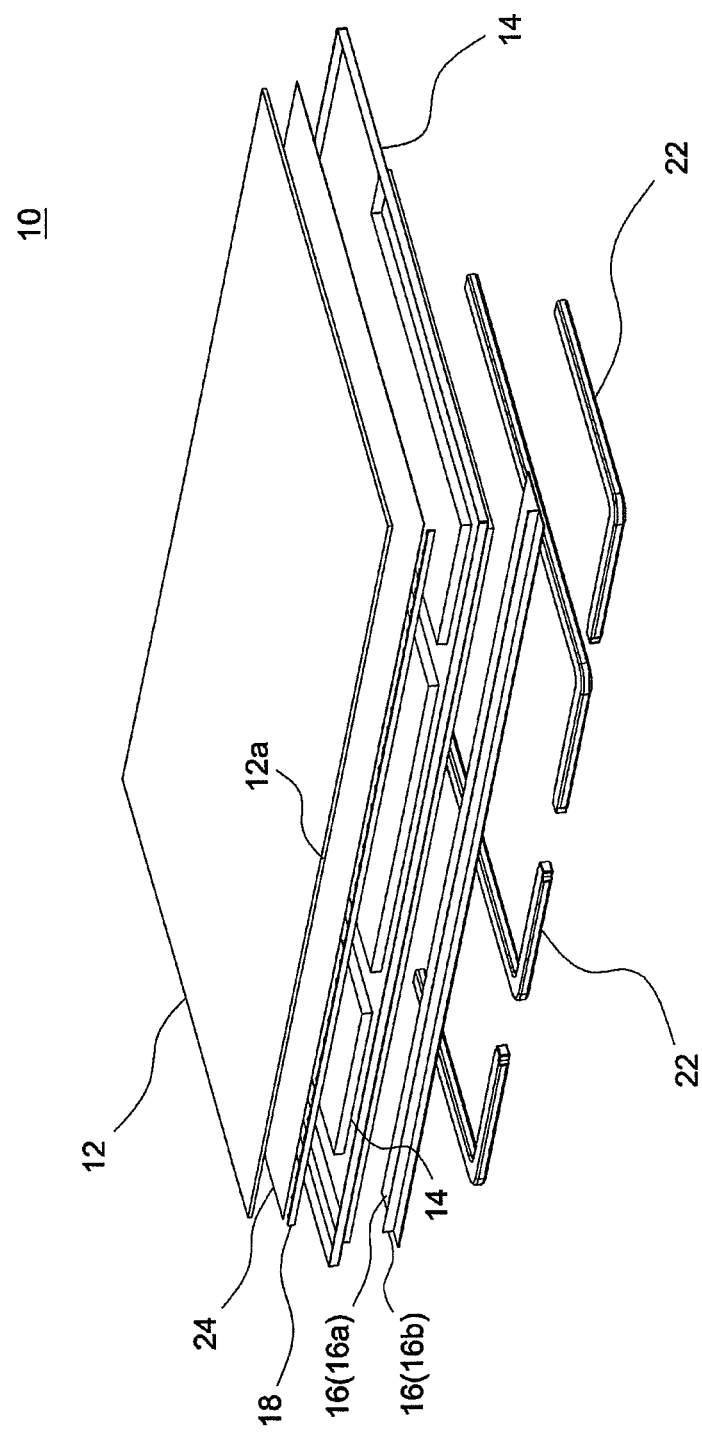
FIG. 1 shows an exploded view of a backlight module according to an embodiment of the invention.
Figure 2:
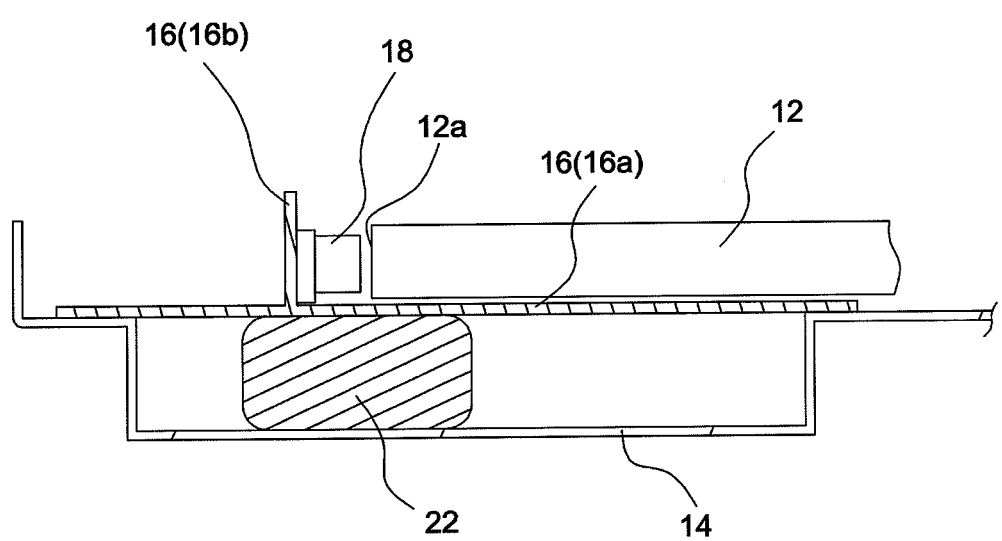
FIG. 2 shows a partial enlarged cross-section of an assembled backlight module according to FIG. 1.
Figure 3:
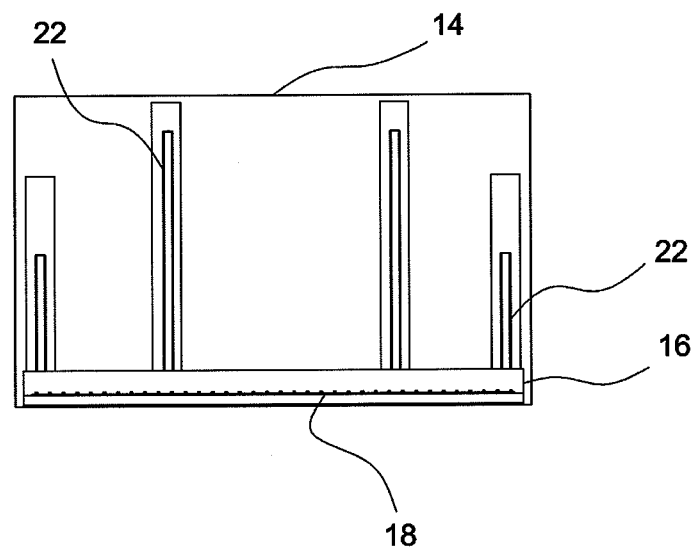
FIG. 3 shows a schematic diagram illustrating an exemplified distribution of the high-performance heat sink on the back plate.
Figure 4:
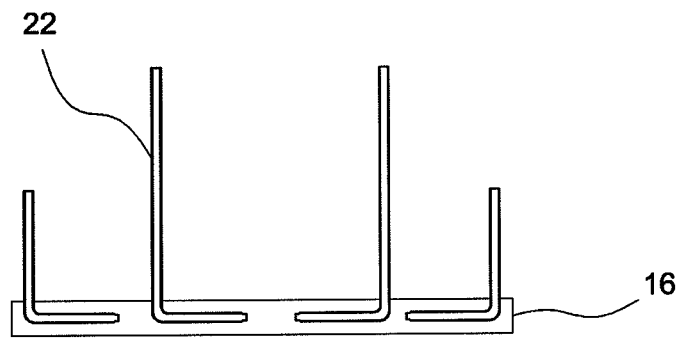
FIG. 4 shows a schematic diagram of a one-piece heat dissipation module according to an embodiment of the invention.

Please refer to both FIG. 1 and FIG. 2, the backlight module 10 includes a light guide plate 12, a back plate 14, a heat-dissipating element 16, a light-emitting element 18, at least one high-performance heat sink 22, and a reflective sheet 24. The light guide plate 12 has a light incident surface 12a, the back plate 14 is disposed on a bottom side of the light guide plate 12, and the heat-dissipating element 16 is disposed adjacent to the light incident surface 12a of the light guide plate 12. The heat-dissipating element 16 has a bottom portion 16a and a side portion 16b, and the side portion 16b forms an angle with the bottom portion 16a. The light-emitting element 18 is disposed on one side of the heat-dissipating element 16 facing the light guide plate 12. The high-performance heat sink 22 is disposed between the heat-dissipating element 16 and the back plate 14, and the high-performance heat sink 22 is in contact with both the heat-dissipating element 16 and the back plate 14. The light-emitting element 18 may be an LED light bar, and the high-performance heat sink 22 may be a heat pipe, a heat column, or a heat spreader. In one embodiment, one end of the high-performance heat sink 22 touches a bottom portion 16a of the heat-dissipating element 16, and another end of the high-performance heat sink 22 extends away from the light-emitting element 18. Please refer to both FIG. 2 and FIG. 3, the high-performance heat sink 22 is in contact with both the heat-dissipating element 16 and the back plate 14. As a result, when heat generated by the light-emitting element 18 is conducted to the heat-dissipating element 16, the end of the high-performance heat sink 22 touching the heat-dissipating element 16 is allowed to quickly absorb the heat and transfer the heat to an opposite end of the high-performance heat sink 22 touching the back plate 14. Besides, the high-performance heat sink 22 extending away from the light-emitting element 18 may spread on different regions of the back plate 14 to facilitate heat dissipation and avoid heat accumulation in an edge-lighting type backlight module. As a result, the heat generated by the light-emitting element 18 is allowed to be effectively conducted to and uniformly dispersed in a cold section of the back plate 14 to ensure thermal uniformity and prevent thermal deformation in the backlight module 10, where thermal deformation often occurs as the backlight module 10 being subject to non-uniform thermal distribution. In one embodiment, the heat-dissipating element 16 and the high-performance heat sink 22 are separately attached to the backlight module 10. Alternatively, as shown in FIG. 4, the heat-dissipating element 16 and the high-performance heat sink 22 may be combined in advance to form a one-piece heat dissipation module 20, and the heat dissipation module 20 is then attached to the backlight module 10 during assembly.

Figure 5A:
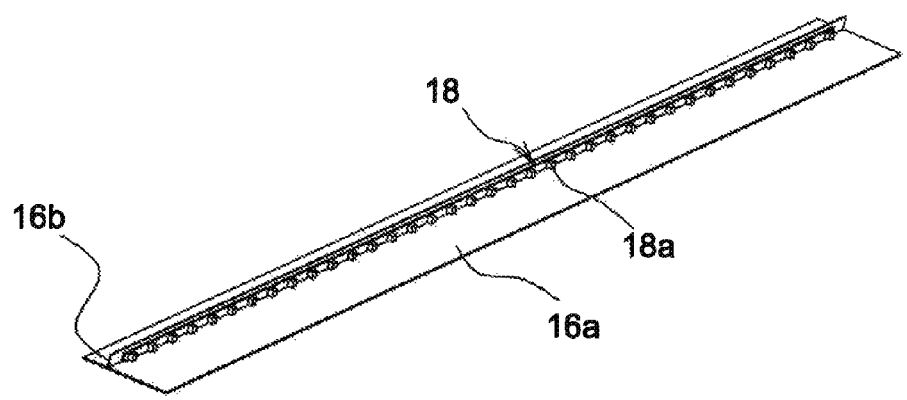
FIG. 5A shows a schematic diagram illustrating an arrangement of a light-emitting element according to an embodiment of the invention.
Figure 5B:
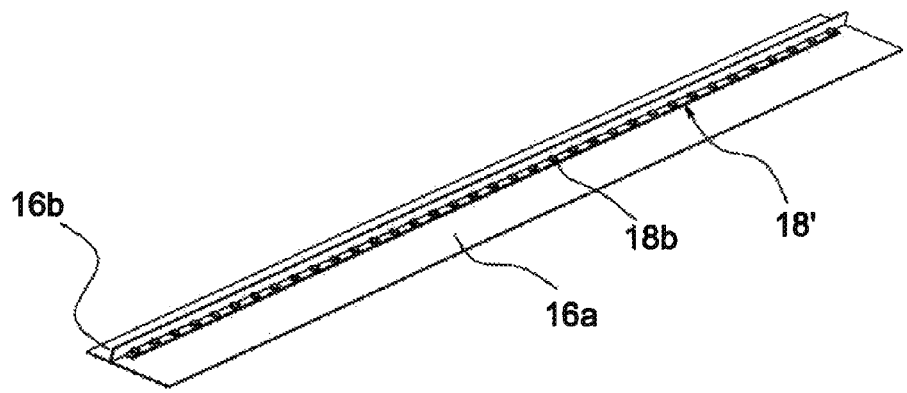
FIG. 5B shows a schematic diagram illustrating an arrangement of a light-emitting element according to another embodiment of the invention.
Figure 6:
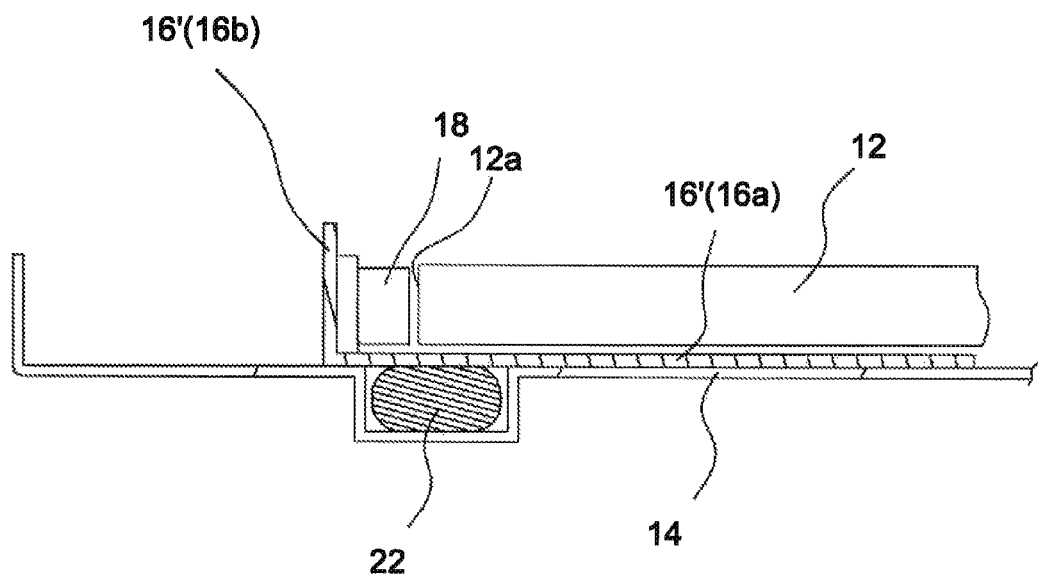
FIG. 6 shows a schematic diagram of a heat-dissipating element according to another embodiment of the invention.

Further, the bottom portion 16a and the side portion 16b of the heat-dissipating element 16 together form the structure of a reinforced rib. The reinforced rib may enhance the structure strength to resist thermal deformation, reduce overall thickness, and improve the heat conduction and heat dissipation efficiency for an LED light bar. In this embodiment, the bottom portion 16a and the side portion 16b of the heat-dissipating element 16 may be perpendicular to each other to form a T-shaped cross-section (FIG. 5A and FIG. 5B), or the heat-dissipating element 16' may have an L-shaped cross-section (FIG. 6). Since an LED light bar is allowed to be screwed on a horizontal wall or a vertical wall of the T-shaped or L-shaped cross-section according to the actual demand, such assembly is suitable for light-emitting diodes having different light-emitting directions. For example, as shown in FIG. 5A, an LED light bar 18 having a plurality of top-emission light-emitting diodes 18a is attached to the side portion 16b of the heat-dissipating element 16. In comparison, as shown in FIG. 5B, an LED light bar 18' having a plurality of side-emission light-emitting diodes 18b is attached to the bottom portion 16a of the heat-dissipating element 16.

The inventor has been performed an experiment on the above edge-lighting type backlight module 10 in contrast to a convention backlight module. According to experiment results, the overall temperature difference of a conventional backlight module is up to about 32° C. (=59° C.-27° C.), the overall temperature difference of the backlight module 10 is about 18° C. (=47° C.-29° C.), and the temperature around the light-emitting element 18 of the backlight module 10 is decreased by 12° C. compared with the conventional backlight module. Accordingly, the heat generated by the light-emitting element 18 is allowed to be effectively conducted to a cold section of the backlight module 10 by the high-performance heat sink 22 to improve thermal uniformity. Besides, heat is not accumulated around the light source of a backlight module to avoid heat accumulation and an extremely high temperature in the backlight module.

Figure 7:
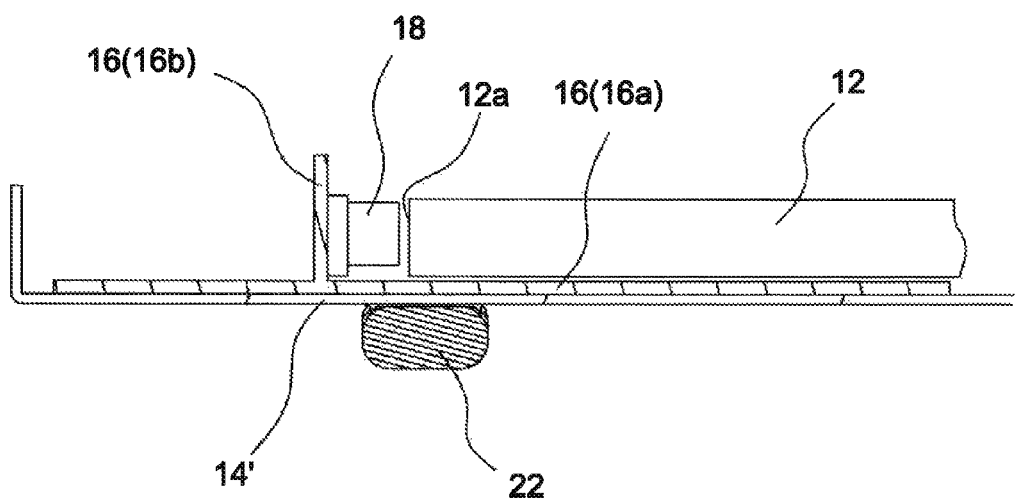
FIG. 7 shows a partial enlarged cross-section illustrating a backlight module according to another embodiment of the invention.
Figure 8A:
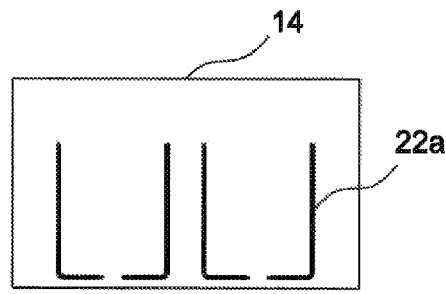
FIG. 8A to FIG. 8F show different schematic diagrams illustrating the distribution of a high-performance heat sink on a back plate according to other embodiments of the invention.
Figure 8B:
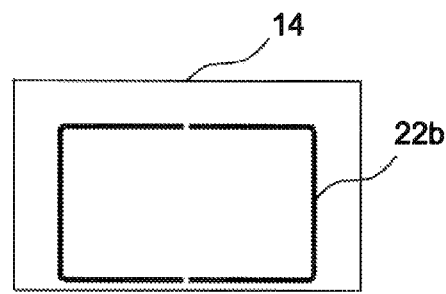
Figure 8C:
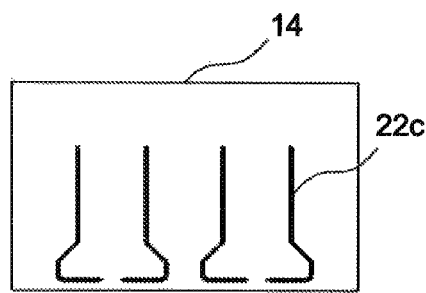
Figure 8D:
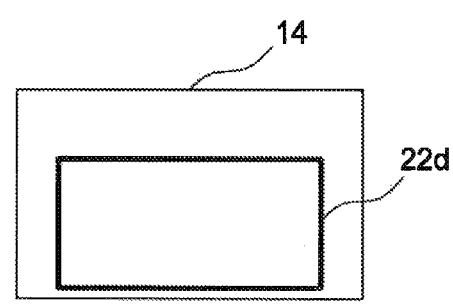
Figure 8E:
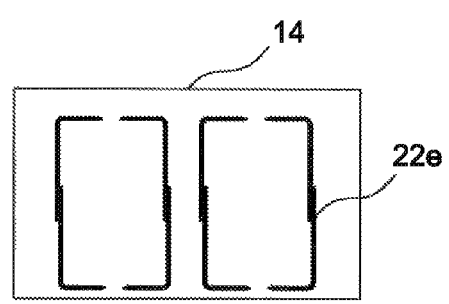
Figure 8F:
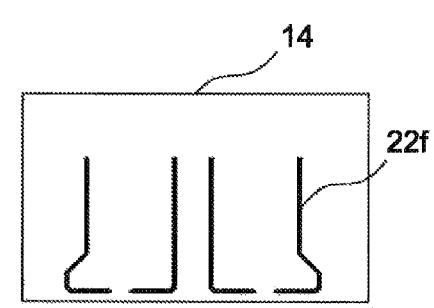
Figure 9:
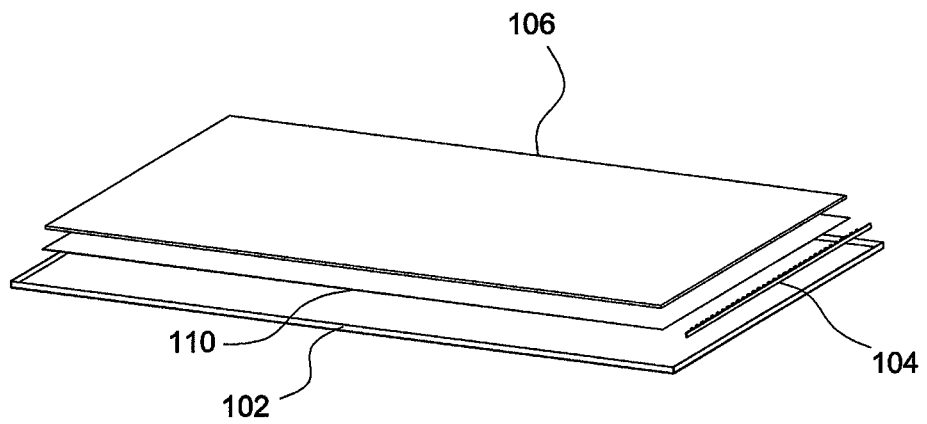
FIG. 9 shows a schematic diagram of a conventional backlight module.

Referring to FIG. 7, the heat-dissipating element 16 and the high-performance heat sink 22 of the backlight module 30 are respectively disposed on two sides of the back plate 14'. The heat-dissipating element 16 is disposed adjacent to the light incident surface 12a of the light guide plate 12 and attached to the 14 back plate 14'. The heat-dissipating element 16 has a bottom portion 16a and a side portion 16b forming an angle with the bottom portion 16a. The light-emitting element 18 is disposed on one side of the heat-dissipating element 16 facing the light guide plate 12. The high-performance heat sink 22 is disposed on the back plate 14', one end of the high-performance heat sink 22 overlaps the heat-dissipating element 16, and another end of the high-performance heat sink 22 extends away from the light-emitting element 18 to quickly conduct and uniformly disperse the heat generated by the light-emitting element 18 to a cold section of the back plate 14'. In this embodiment, the high-performance heat sink 22 is disposed on one side of the back plate 14' rather than between the heat-dissipating element 16 and the back plate 14', so a contact area between the high-performance heat sink 22 and the back plate 14' is increased to further improve heat dissipation efficiency.

Further, as shown in FIG. 8A to FIG. 8F, the distribution of the high-performance heat sink 22a-22f on the back plate 14 is not limited. As long as the high-performance heat sink 22a-22f is spread on different regions of the back plate 14, high thermal uniformity and heat dissipation efficiency are obtained.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
   a light guide plate having a light incident surface;
   a back plate disposed on a bottom side of the light guide plate;
   a heat-conducting substrate disposed adjacent to the light incident surface, the heat-conducting substrate having a bottom portion and a side portion forming an angle with the bottom portion;
   a light-emitting element disposed on one side of the heat-conducting substrate facing the light guide plate, wherein the light-emitting element is an LED light bar; and
   at least one heat sink disposed in contact with the back plate, wherein the heat sink comprises one of a heat pipe, a heat column, and a heat spreader, the heat sink has at least one longitudinal body, the longitudinal body has a first end and a second end opposite the first end, the first end of the longitudinal body of the heat sink touches the heat-conducting substrate, and the second end of the longitudinal body of the heat sink does not touch the heat-conducting substrate and is not overlapped with the heat-conducting substrate.

2. The backlight module as claimed in claim 1, wherein the LED light bar has a plurality of top-emission light-emitting diodes and is attached to the side portion of the heat-conducting substrate.

3. The backlight module as claimed in claim 1, wherein the LED light bar has a plurality of side-emission light-emitting diodes and is attached to the bottom portion of the heat-conducting substrate.

4. The backlight module as claimed in claim 1, wherein the heat-conducting substrate has a T-shaped cross-section or an L-shaped cross-section.

* * * * *